United States Patent
Logan et al.

(10) Patent No.: US 6,824,683 B2
(45) Date of Patent: Nov. 30, 2004

(54) ANAEROBIC TREATMENT OF WASTES CONTAINING INSOLUBLE COMPONENTS

(75) Inventors: Peter Alan Logan, Manly West (AU); Michelle Elaine Hayes, New Farm (AU)

(73) Assignee: Fungi & Gulp PTY Ltd., Queensland (AT)

(*) Notice: Subject to any disclaimer, the term of this patent is extended or adjusted under 35 U.S.C. 154(b) by 0 days.

(21) Appl. No.: 10/357,836

(22) Filed: Feb. 3, 2003

(65) Prior Publication Data

US 2003/0173263 A1 Sep. 18, 2003

Related U.S. Application Data

(63) Continuation of application No. PCT/AU01/00948, filed on Aug. 3, 2001.

(30) Foreign Application Priority Data

Aug. 4, 2000 (AU) .............................................. PQ9221

(51) Int. Cl.[7] ................................................. C02F 3/30
(52) U.S. Cl. ........................ 210/605; 210/612; 210/631; 210/908; 435/262.5
(58) Field of Search ................................ 210/605, 620, 210/630, 252, 259, 908, 612, 614, 631; 71/10; 435/262, 262.5

(56) References Cited

U.S. PATENT DOCUMENTS

| | | | | |
|---|---|---|---|---|
| 4,213,857 A | * | 7/1980 | Ishida et al. | 210/603 |
| 4,279,753 A | * | 7/1981 | Nielson et al. | 210/605 |
| 4,622,982 A | * | 11/1986 | Gaisch et al. | 131/297 |
| 4,983,297 A | * | 1/1991 | Kaczmarek et al. | 210/605 |
| 5,223,140 A | * | 6/1993 | Rutherford et al. | 210/605 |
| 6,235,196 B1 | * | 5/2001 | Zhou et al. | 210/605 |
| 6,303,367 B1 | * | 10/2001 | Kataoka et al. | 435/262.5 |
| 6,423,229 B1 | * | 7/2002 | Mao | 210/603 |

OTHER PUBLICATIONS

Garrido et al., "Nitrification of waste water from fish–meal factories", Jul. 1998, Water SA, vol. 24 No. 3, pp. 245–249.*

* cited by examiner

Primary Examiner—Fred G. Prince
(74) Attorney, Agent, or Firm—Morgan, Lewis & Bockius, LLP (57) ABSTRACT

A process of waste treatment which includes the following steps: (a) passing waste material comprising an insoluble component through an anaerobic bioreactor system including a plurality of bioreactors in series and maintaining said insoluble component as a suspension in the waste material, whereby the pH of the waste material is maintained below 4.9 for a period of at least 24 hours; b) aerating the waste material after step (a); and (c) removing the insoluble component from the waste material before or after step (b). The process also provides for successful treatment of grease-trap waste.

48 Claims, 5 Drawing Sheets

ANAEROBIC TREATMENT OF WASTES CONTAINING INSOLUBLE COMPONENTS

This application is a continuation of International Patent Application PCT/AU01/00948, filed Aug. 3, 2001, which claims the benefit of priority to Australian Application PQ9221, filed Aug. 4, 2000.

This invention relates to a waste treatment process and plant which is suitable for treatment of waste inclusive of biological waste exemplified by faeces, sewage and household waste and commercial and industrial waste inclusive of greasetrap waste.

Reference may be made to International Patent Publication WO 95/25071 which refers to waste treatment plant and process which includes the steps of:

(i) passing waste material comprising an insoluble component through a bioreactor system including a plurality of bioreactors in series and maintaining said insoluble component as a suspension in said waste material;

(ii) passing treated waste material from said bioreactor is system to one or more acidification tanks to reduce the pH below 4.5 to produce free volatile fatty acids for elimination of bacterial pathogens in said treated waste material; and (iii) separating the insoluble component from the waste material before or after step (ii).

It was an essential feature of the invention disclosed in International Publication WO 95/25071 that after treatment of the waste material in the bioreactor system that the treated waste material was passed to one or more acidification tanks to facilitate the elimination of bacterial pathogens by free volatile fatty acids (VFAs).

However, unexpectedly, it has now been found that it is more efficient, in relation to some waste, inclusive of greasetrap waste, in disposal or elimination of bacterial pathogens, to maintain the pH of the waste material below 4.9 for at least 24 hours when the waste material is being passed through the bioreactor system. This means that an effective process of waste treatment may take place which can eliminate step (ii) of the process of WO 95/25071 to thereby produce a more simplified and economical process of waste treatment.

Therefore the invention provides a process of waste treatment which includes the following steps:—

(a) passing waste material comprising an insoluble component through an anaerobic bioreactor system optionally including a plurality of bioreactors in series and maintaining said insoluble component as a suspension in said waste material, whereby the pH of the waste material is maintained below 4.9 for a period of at least 24 hours;

(b) aerating the waste material after step (a); and (c) removal of the insoluble component from the waste material before or after step (b).

The waste material will usually, in most circumstances, have a pH of around 5.3–5.8 and thus will need to be subjected to a pH lowering step prior to being fed into the bioreactor system or when passing through the anaerobic bioreactor system. More preferably, the pH lowering step will take place when the waste material is passing through the bioreactor system. However, it will be appreciated that in some circumstances, because of the nature of the waste material, prior to being fed into the bioreactor system, a pH lowering step may not be necessary. However, this event is relatively rare. In any event it will be appreciated that the pH of the waste material will be monitored as it passes through the anaerobic bioreactor system.

Usually the pH lowering step will involve the addition of a strong mineral acid such as hydrochloric acid, sulphuric acid or nitric acid. However, this does not preclude the use of other acids such as phosphoric acid, perchloric acid or strong organic acids which will achieve the same effect.

The bioreactor system will comprise a plurality of bioreactors as described in WO 95/25071 the contents of which are totally incorporated herein by reference.

However, as in the case of WO 95/25071, each bioreactor may be interconnected by an overflow conduit so that waste material or effluent is quickly and efficiently transferred from one bioreactor to an adjacent bioreactor without the need for pumping material so as to transfer material from one bioreactor to another. Suitably each bioreactor is provided with agitation means which keeps the contents of each bioreactor in the form of a slurry or suspension so that solid particles are maintained in a suspended state.

The contents of each bioreactor may be also subject to heating means and in one form this may be provided by steam being passed into and out of each bioreactor. However, other forms of heating means may be adopted, such as electrical heating. Preferably, the temperature in each bioreactor is maintained by suitably thermostatically controlled means between 25–40° C. and more suitably 30–40° C.

Preferably, the pH of a first bioreactor is maintained between 4.8–5.5 and more preferably around 5.0. The pH of the second bioreactor is suitably maintained between 3.6–4.9, more preferably between 4.0–4.7 and most preferably, about 4.3 Preferably, the retention time in each bioreactor may be 12–48 hours, but more suitably is 24 hours.

The waste material which is subject to the process of the invention may comprise human or animal faeces and preferably faeces from livestock feedlots which may have a stockfeed component containing lignocellulose. In fact the process of the invention is extremely efficient in treatment of waste which requires an initial anaerobic fermentation step to break down complex macromolecules such as carbohydrates and proteins to short chain organic acids of 8 carbon atoms or less. Also complex macromolecules such as lipids may be broken down to long chain organic acids of 9 carbon atoms or more and glycerol. This fermentation step usually takes place in the presence of acidogenic fermentative bacteria and lipolytic bacteria which can produce organic acids such as volatile fatty acids and long chain fatty acids, which may be readily metabolised to carbon dioxide and water.

In the initial anaerobic fermentation step use may be made of a series of anaerobic bioreactors as described above which are designed so that oxygen or air is prevented from being introduced into each of the bioreactors. Usually the amount of dissolved oxygen will be very low and be less than 0.7 mg/l. Such bioreactors therefore may be sealed from atmosphere.

After passage through a number of anaerobic reactors e.g. usually from 2–6 and more preferably from 3–6 and suitably 5 in number, the waste so treated may then be passed to an aerobic tank or aerated system. It may comprise one cell or a plurality of aerobic or aerated cells wherein an air line may supply air or oxygen to aerators or jets which feed the air under pressure into the cell(s). Usually the aerators may function under diffusion but mechanical aerators may also be utilised. The aerator may be of plug-flow configuration as described in U.S. Pat. No. 5,380,438 or may be of a step-feed and complete-mix aeration configuration or alternatively an activated sludge system.

Most preferably the aeration system may comprise a tank having a sparger at the bottom of the tank, in which air is fed into the tank under pressure.

If desired, the waste material after passage from the anaerobic bioreactor system may be subjected to a separation procedure to remove a solid component such as sludge. This may be achieved by passing the waste material over a screen which is subject to the action of wash water above and below the screen to prevent clogging or blockages occurring in pores or passages located in the screen. Preferably use may be made of a filter system known as the BAYLEEN filter system.

Figure 1:
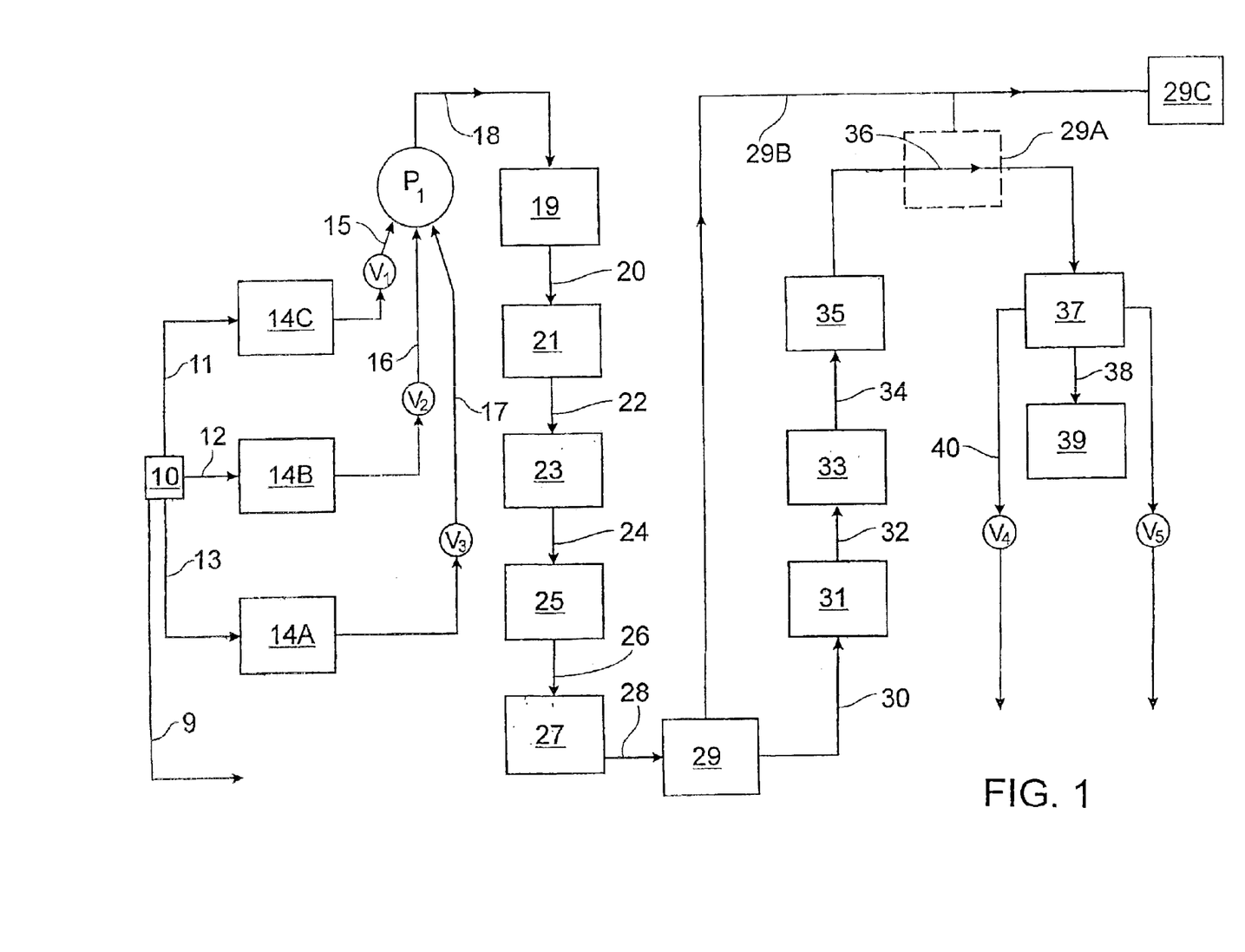
Figure 2:
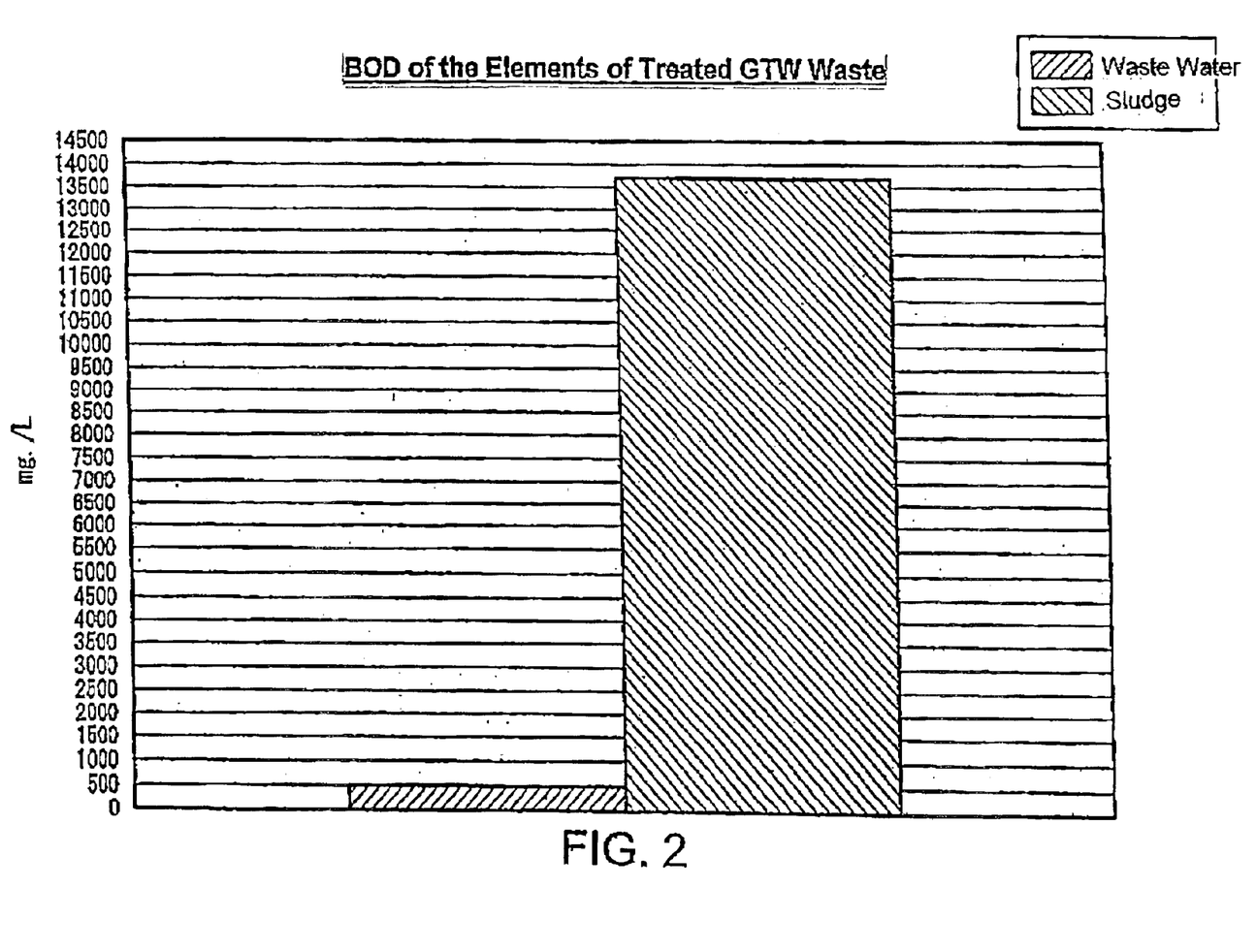
Figure 3:
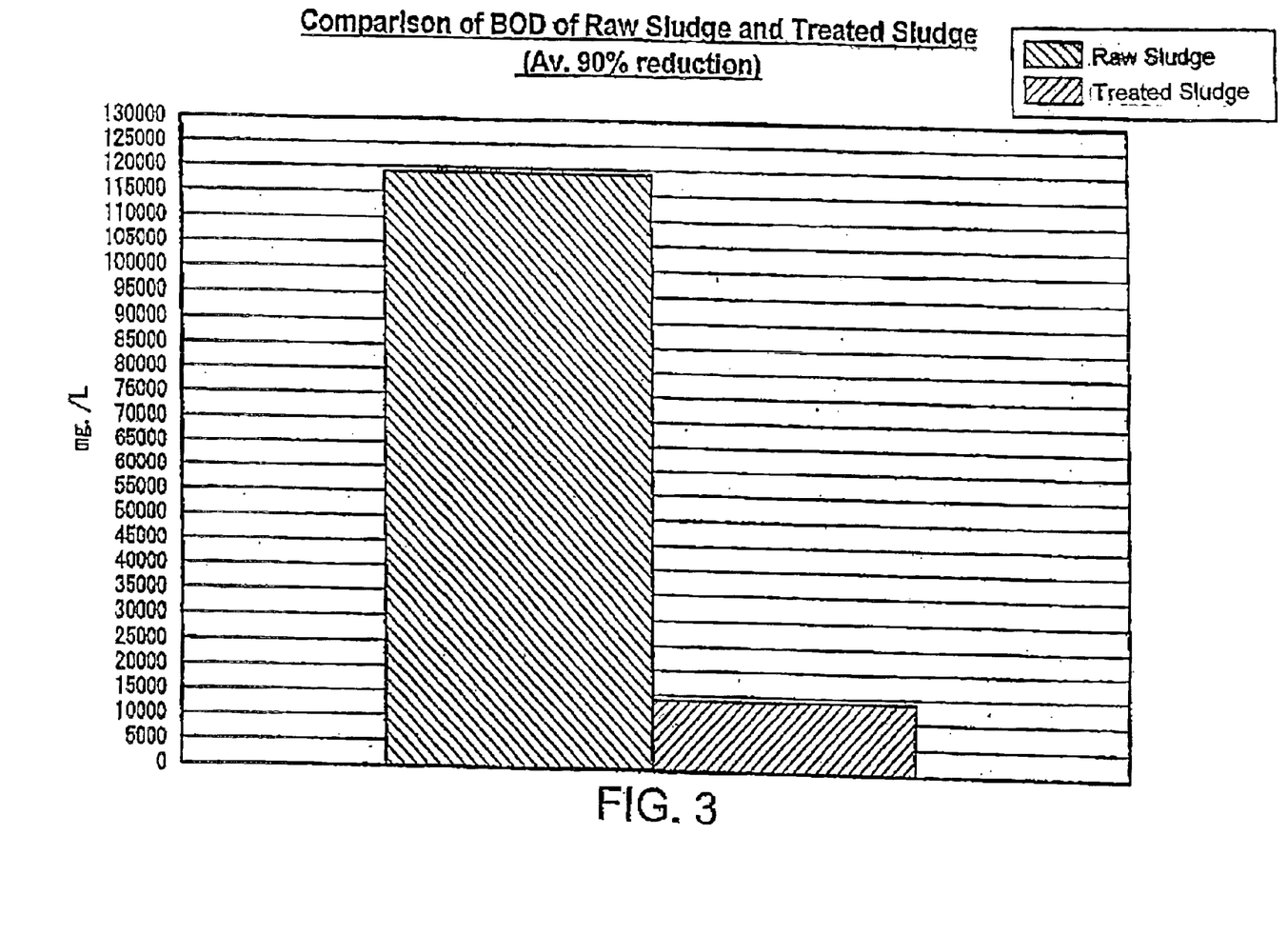
Figure 4:
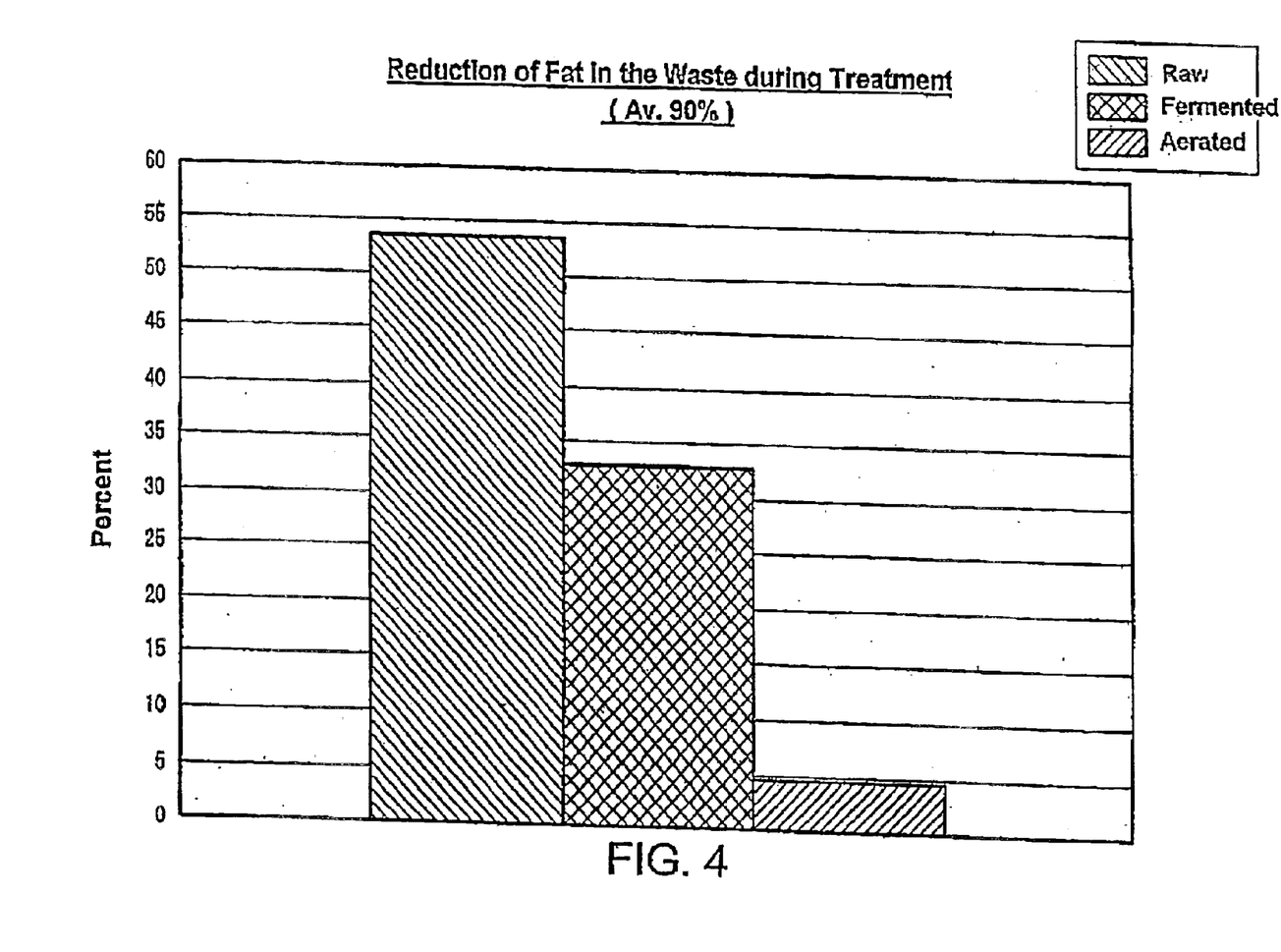
Figure 5:
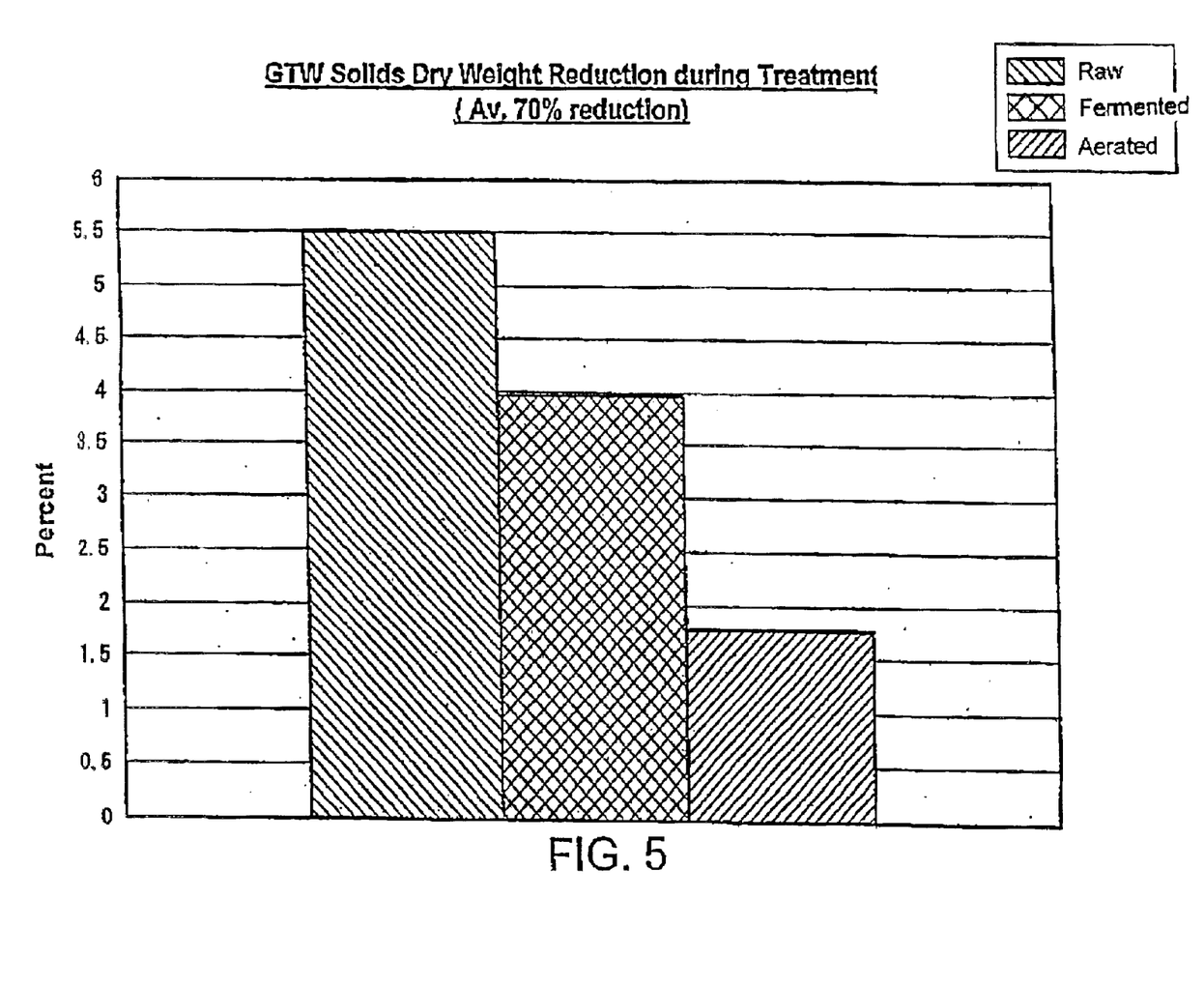

Reference may now be made to a preferred embodiment of the invention as shown in the attached drawing in FIG. 1, wherein initially, faeces from an animal feedlot or commercial or industrial waste such as greasetrap waste are delivered to a loading bay 10 wherein waste may be conveyed to holding tanks 14A, 14B and 14C along conduits 11, 12 and 13 respectively. If desired low strength organic waste having a low BOD of around 2000–3000 mg/l may be delivered to a composting area through conduit 9.

Initially the waste may be passed through a hydrocyclone or centrifugal separator (not shown) to remove large foreign bodies such as spoons, knives, nuts, bolts etc. Loading bay 10 may also comprise a macerator pump for transporting waste to holding tanks 14A, 14B and 14C.

Each of the holding tanks 14A, 14B and 14C may be used for different kinds of waste material e.g. faeces from animal feedlots in tank 14A, greasetrap waste in tank 14B and sewage waste in tank 14C. Alternatively each tank may be used to store the same kind of waste or mixture of wastes.

After being held for a suitable time (e.g. 12–24 hours) waste from each of tanks 14A, 14B and 14C is pumped by pump P1 along separate conduits 15, 16 and 17, each having valves V1, V2 and V3. Pump P1 after collecting the waste from conduits 15, 16 and 17 may transfer the collected waste to bioreactor 19 through conduit 18.

Alternatively each of conduits 15, 16 and 17 may be provided with their own pump for transfer of fluid to bioreactor 19.

In bioreactor 19 the waste may be maintained at a pH of around 4.8–5.5 or more suitably 5.0. Usually the average dry weight of solid material discharged into bioreactor 19 will be of the order of 3.5–8.5% dry weight and more preferably 4.0 dry weight %.

In relation to treatment of waste, emulsifier in the form of anionic, cationic, amphoteric or non-ionic surfactant may be added to produce an emulsion of triglyceride droplets in the liquid (i.e. mostly water) in the waste material. This renders the triglyceride droplets more susceptible to the action of lipases. The emulsifier is preferably sodium lauryl sulfate, sodium lauryl ether sulfate, or ammonium lauryl sulfate. Most preferably the emulsifier is sold commercially under the GARDINOL or TEEPOL trade mark. However, it will be appreciated that other emulsifiers may be used including soaps i.e. metallic or alkanolamine salts of fatty acids, alkyl benzene sulfonates, $C_{14-16}$ alpha olefin sulfonates or alkyl sulfates derived from myristyl alcohols. However, any type of surfactant may be utilised which is effective in providing a triglyceride emulsion in water as referred to above.

It also may be useful to add lipolytic bacteria to bioreactor 19 and such bacteria may be obtained from animal faeces inclusive of pig faeces, bovine faeces, human faeces or mixtures thereof and most preferably faeces obtained from animals who are 0–7 days old.

Lipolytic bacteria hydrolyse triacylglycerols or triglycerides to yield free long chain fatty acids and glycerol and are exemplified by bacteria of the genus *Veillonella* and *Anerovibrio* which are found in faeces.

Proteolytic bacteria may also be added to bioreactor 19 which convert the majority of the protein to branched chain volatile fatty acids and ammonia nitrogen. Such bacteria may include *Bacteroides*, *Clostridia* and *Bifidobacterium* and are commonly found in faeces.

Saccharolytic bacteria also found in faeces convert carbohydrate to straight chain volatile fatty acids and may include *Clostridia, Butyrivibrio, Streptococcus, Bacteroides* and *Megasphera elsdenii*.

Faeces also contain facultative anaerobes which are active in oxygen rich atmosphere or atmosphere which is depleted in oxygen and are exemplified by *Enterobacteriacae*. Such bacteria reduce oxygen present in the fermentation liquor.

Faeces also contain hydrolytic fermentative and acid forming bacteria which produce volatile fatty acids.

Such volatile fatty acids may include acetic acid, propionic acid, butyric acid, valeric acid, caproic acid, heptanoic acid and octanoic acid. Branched volatile fatty acids may also be produced such as isobutyric acid and isovaleric acid.

Usually 5–100 g and more preferably 30–45 g wet weight of faeces to each 1000 litres of waste as an initial inoculum is added to bioreactor 19. Alternatively the faeces may be added as solids. Pig faeces is considered to be a good source of lipolytic bacteria and bovine faeces is a good source of proteolytic and saccharolytic bacteria.

There also may be added elements comprising N, S, C, P and K as well as Mg, Ca, Na and Cl$^-$. A rich source of N, P and K is agricultural fertiliser inclusive of meatmeal, blood and bone, urea and superphosphate. A preferred source of N is ammonium hydroxide and preferably 0.5–5.0 ml/litre of waste is added to bioreactor 19. Most preferably this is 2 ml/litre. Usually the ammonium hydroxide has a strength of 25% ammonia. Also sources of carbon such as readily fermentable carbohydrate exemplified by rice, sweet corn and potatoes may be added if appropriate. Molasses may also be used and a preferred concentration of molasses is 2–12 ml/litre of waste and more preferably 7 ml/litre. Molasses is usually used when processing greasetrap waste and also for activated sludge derived from aerated human sewage.

It is emphasised that the content of the waste stream entering bioreactor 19 is extremely variable and thus should be monitored to check whether the abovementioned elements should be added.

After the waste has been retained in bioreactor 19 for 24 hours, to allow anaerobic fermentation to take place as described above, the waste is then transferred to bioreactor 21 through line 20. When the waste is in bioreactor 21 acid suitably in the form of industrial strength sulphuric acid may be added to bioreactor 21. This will lower the pH to around 4.0–4.7 and more suitably 4.3 to promote the action of the free VFAs described above in killing bacterial pathogens in the waste. This pH is maintained for a period of at least 24 hours. Preferably 1–10 ml of acid per litre of waste is added and more preferably this is 5 ml/litre. Usually the acid is industrial grade i.e. 50% strength.

The waste is then transferred to bioreactor 23 through line 22 and the pH of the waste is adjusted to 6.0–8.0 in the case of greasetrap waste by addition of NaOH, KOH or other suitable base. Usually from 5–25 ml of base is added per litre of waste and more preferably this is 10 ml/litre. The base is usually 40% wt/v strength. The raising of the pH in this manner is important in that it facilitates the activity of the lipases which are present in the waste stream and thus the triglycerides or triacylglycerols are converted to glycerol and long chain fatty acids such as oleic acid, palmitic acid, aconitic acid or lauric acid.

In the case of non greasetrap waste the pH of bioreactors 23, 25 and 27 may be maintained between 5.8–6.4.

If necessary faeces may also be added to the waste in bioreactor 23 and this is preferably physiologically active faeces such as new born (0–7 days) pig faeces. A similar concentration may be added as described above in relation to the addition of faeces to bioreactor 19.

The waste may then be transferred from bioreactor 23 to bioreactor 25 through line 24 and finally to bioreactor 27 through line 26. The use of 5 bioreactors (i.e. 19, 21, 23, 25 and 27) are preferable because it provides a sufficient period of time to maximise the action of the lipolytic bacteria in catalysis of the triglycerides. Therefore the residence time in each bioreactor is preferably 24 hours so that this objective may be achieved.

At the end of the fermentation the fermented waste, including any indigestible solids, is transferred to aeration vessels 31, 33 and 35. However it is emphasised that while a plurality of aeration vessels is illustrated, only a single aeration vessel may be utilised in the context of the present invention. In the aeration vessels aerobic bacteria may be added such as Acinetobacter sp. to remove N and P in the presence of VFAs. Also appropriate nutrients such as nitrogen and other elements, as described above and in the same concentration, may be added to the aeration vessels so that the volatile fatty acids and long chain acids may be oxidised to carbon dioxide and water. The total time of aeration may be from 2–5 days and more preferably 5 days.

Fermented waste may be transferred to a filter 29 along line 28 before the filtered waste enters aeration vessel 31 through line 30. Filter 29 is preferably a filter known as the BAYLEEN filter described above which is in the form of a stainless steel filter having apertures of around 20–200 microns wherein a fine spray washes solids down the screen for ultimate collection at the base of the screen. Liquid filtrate passes through the apertures. In this filter jets of water are applied downwardly onto the screen and upwardly to inhibit clogging of the apertures. Such a filter is described in International Publication WO 98/23357, which is totally incorporated herein by reference.

Alternatively, screw press filters may be used or parabolic stainless steel screens.

Alternatively, after the aerated waste has passed through aeration vessels 31, 33 and 35 through lines 32, 34 and 36 such aerated waste may be subjected to the action of filter 29A after passage of the waste through aerated vessel 35. This alternative may be preferable to use of filter 29 because if filtration takes place prior to aeration, a significant quantity of VFAs and long chain fatty acids may adhere to the separated solids. This may provide a more active sludge for disposal and a weaker or more dilute residue solution to be oxidised by aeration vessels 31, 33 and 35.

Solids may be transported from filter 29 or 29A through line 29B to composting area 29C or transported from the treatment plant.

At the end of aeration, the dry weight solids in the raw waste have been reduced by about 70% and the BOD of the raw waste has been reduced by about 90%.

After passage to liquid holding tank 37 through line 36, the aerated liquid may be held in holding tank 37 for a period of time (12–24 hours) prior to passage to tank 39 through line 38. Subsequently the aerated liquid may be transferred through lines 40 and 41 to wetlands or retention ponds as appropriate. Each of lines 40 and 41 are provided with valves V4 and V5.

In FIG. 1 lines 40 and 41 are shown extending from tank 37 and this is appropriate when only a single holding tank is utillsed. However, if tank 39 is used, lines 40 and 41 may be connected to this tank rather than tank 37.

In relation to holding tanks 14A, 14B and 14C these may be above ground plastics tanks of 45,000 litre capacity and maintained at a temperature of 20–40° C.

The influent waste material may be a solids size range of 2–5 mm. The pH may be 5.8–6.4 or in the case of greasetrap waste may be 5.3–5.8. The temperature of the influent waste material may be 20–30° C. and have a design flow of around 73.5 l/hour.

Each of the bioreactors 19, 21, 23, 25 and 27 may be of the same structure as described in WO 95/25071 and hence are only shown in schematic form in FIG. 1. The temperature of each of the bioreactors may be maintained at a temperature of 37° C.

EXAMPLE

Four sample runs were carried out as shown in Table 1 and the weight per volume of influent waste material was 5.46% w/v, 5.76% w/v, 5.27% w/v and 5.44% w/v. In bioreactor 27 these amounts had decreased to 3.54%, 3.56%, 3.54% and 3.77%. In the case of aeration tank 35 these amounts had decreased to 1.6–1.9% as shown. The results in respect of BOD for bioreactor 19 and the final aerator are shown and results are also given for the BOD of the sludge and water in the final aerator. The amount of volatile fatty acids (VFA) in millimoles for the first, second and final aerators are also shown. The COD value for the first, second and final aerators are also provided.

The COD and BOD for the raw waste averaged out was 52500 mg/l and 23865 mg/l. At the end of the waste treatment these values had decreased to 16100 mg/l and 2925 mg/l respectively. The BOD for raw sludge was 119325 and this had decreased to 13675. The BOD for the final aerated water was 530.

At the end of fermentation the average result for the fermented waste in relation to dry wt % for solids was 3.96 and this had decreased to 1.785 after aeration. The amount of fat in the raw waste was 53% of the total solids and this percentage had decreased to 33% at the end of the fermented stage and 5% at the end of the aerated stage. The actual gram weight of solids of the raw waste was 2.47 and this had decreased to 1.85 at the end of the fermented stage and 0.85 at the end of the aerated stage. In relation to fat content this was 1.32 g in the raw sludge and this had decreased to 0.6/g at the end of the fermented stage and 0.04 g at the end of the aerated stage. The ratio of COD to BOD of the raw sludge was 2.2:1 and after aeration this ratio was 5.4:1

These results are also shown graphically in FIGS. 2–5.

TABLE 1

| | Dry Weight % w/v | | | COD mg/l | | BOD mg/l | | BOD mg/l Sludge | BOD mg/l Water | VFA (millimoles) | | |
|---|---|---|---|---|---|---|---|---|---|---|---|---|
| Sample Number | Feed | First Bioreactor | Final Aerator | First Bioreactor | Final Aerator | First Bioreactor | Final Aerator | Final Aerator | Final Aerator | First Aerator | Second Aerator | Last Aerator |
| 1 | 5.46 | 3.54 | 1.6 | 50625 | 18600 | 23011 | 3382 | 16732 | 613 | 98 | 70 | 73 |
| 2 | 5.76 | 3.56 | 1.6 | 56875 | 12500 | 25852 | 2273 | 11245 | 412 | 97 | 73 | 79 |
| 3 | 5.27 | 3.54 | 1.9 | 55000 | 14500 | 25000 | 2636 | 13044 | 478 | 88 | 81 | 0 |
| 4 | 5.44 | 3.77 | | 47500 | 8500 | 21591 | 1545 | 7647 | 280 | 79 | 33 | 31 |

What is claimed is:

1. A process of waste treatment which includes the following steps:
   (a) passing waste material comprising an insoluble component through an anaerobic bioreactor system and maintaining said insoluble component as a suspension in the waste material, whereby the pH of the waste material is maintained below 4.9 for a period of at least 24 hours;
   (b) aerating the waste material after step (a); and
   (c) removing the insoluble component from the waste material before or after step (b).

2. A process as claimed in claim 1, wherein the anaerobic bioreactor system includes a plurality of bioreactors in series.

3. A process as claimed in claim 2, wherein the waste material is retained in each bioreactor for a period of 12–48 hours.

4. A process as claimed in claim 3, wherein the waste material is retained in each bioreactor for 24 hours.

5. A process as claimed in any one of claim 2, wherein each bioreactor in said bioreactor system are interconnected by an overflow conduit for transfer of waste material from one bioreactor to an adjacent bioreactor.

6. A process as claimed in claim 5, wherein each bioreactor is heated between 25–40° C.

7. A process as claimed in claim 6, wherein each bioreactor is heated between 30–40° C. and thermostatically controlled.

8. A process as claimed in claim 5, wherein each bioreactor agitates the waste material so as to maintain the waste material as a suspension.

9. A process as claimed in any one of claim 2, wherein the pH of a first bioreactor is maintained between 4.8–5.5.

10. A process as claimed in claim 9, wherein the pH of a second bioreactor is maintained between 3.6–4.9.

11. A process as claimed in claim 10, wherein the pH of the second bioreactor is maintained between 4.0–4.7.

12. A process as claimed in claim 11, wherein the pH of the second bioreactor is maintained at 4.3.

13. A process as claimed in claim 9, wherein the pH of the first bioreactor is maintained at 5.0.

14. A process as claimed in claim 2, wherein the amount of dissolved oxygen in each bioreactor is less than 0.7 mg/l.

15. A process as claimed in claim 2, wherein there are 2–6 bioreactors.

16. A process as claimed in claim 15, wherein there are 5 bioreactors.

17. A process as claimed in claim 1, wherein the pH of the waste material is monitored during step (a) and a pH lowering step occurs when the waste material passes through said bioreactor system.

18. A process as claimed in claim 17, wherein the pH lowering step involves the addition of a strong mineral acid to the waste material selected from hydrochloric acid, sulphuric acid or nitric acid.

19. A process as claimed in claim 18, wherein 1–10 ml of mineral acid per litre of waste is added to the bioreactor system.

20. A process as claimed in claim 1, wherein the pH of the waste material is monitored during step (a) and no pH lowering step is necessary as the pH is maintained below 4.9 for a period of at least 24 hours.

21. A process as claimed in claim 20, wherein a pH lowering step occurs prior to step (a).

22. A process as claimed in claim 1, wherein step (c) occurs before step (b).

23. A process as claimed in claim 22, wherein the waste material is passed through a filter screen which is subjected to the action of wash water above and below the filter screen.

24. A process as claimed in claim 1, wherein the average dry weight of waste material discharged into the bioreactor system will be 3.5–8.5% dry weight.

25. A process as claimed in claim 24, wherein the dry weight of the waste material is 4.0%.

26. A process as claimed in claim 1, wherein faeces is added to the waste material in the bioreactor system.

27. A process as claimed in claim 26, wherein 5–100 g wet weight of faeces per each 1000 litres of waste material is added to the waste material in the bioreactor system.

28. A process as claimed in claim 27, wherein 30–45 g of wet weight of faeces per each 1000 litres of waste material is added to the waste material.

29. A process as claimed in claim 26, wherein faeces in solid form is added to the waste material.

30. A process as claimed in claim 26, wherein a second injection of faeces is added to the bioreactor system.

31. A process as claimed in claim 1, wherein 0.5–5.0 ml/litre of waste of ammonium hydroxide is added to the bioreactor system.

32. A process as claimed in claim 31, wherein 2.0 ml/litre of ammonium hydroxide is added to the bioreactor system.

33. A process as claimed in claim 1, wherein readily fermentable carbohydrate is added to the waste material in the bioreactor system.

34. A process as claimed in claim 33, wherein 2–12 ml/litre of waste of molasses is added to the bioreactor system.

35. A process as claimed in claim 34, wherein 7 ml/litre of waste of molasses is added to the bioreactor system.

36. A process as claimed in claim 1, wherein 5–25 ml of base per litre of waste is added to the bioreactor system during or after step (a) to elevate the pH of the waste material to 7.0–8.0.

37. A process as claimed in claim 36, wherein 10 ml of base per litre of waste is added to the bioreactor system.

38. A process as claimed in claim 1, wherein aeration step (b) takes place in a tank having a submersible sparger in which air is fed into the tank under pressure.

39. A process as claimed in claim 1, wherein step (c) occurs after step (b).

40. A process as claimed in claim 1, wherein emulsifier is added to the waste material in the bioreactor system to produce an emulsion of triglyceride droplets in the waste material which is substantially in liquid form.

41. A process as claimed in claim 1, wherein lipolytic bacteria are added to the waste material in the bioreactor system.

42. A process as claimed in claim 1, wherein proteolytic bacteria are added to the waste material in the bioreactor system.

43. A process as claimed in claim 1, wherein saccharolytic bacteria are added to the waste material in the bioreactor system.

44. A process as claimed in claim 1, wherein elements comprising N, S, C, P, K, Mg, Ca, Na, and Cl— is added to the waste material in the bioreactor system.

45. A process as claimed in claim 1, wherein agricultural fertiliser is added to the waste material in the bioreactor system.

46. A process as claimed in claim 1, wherein in the aeration step (b) nutrients inclusive of nitrogen and other elements are added to the aeration vessel to facilitate oxidation of volatile fatty acids to carbon dioxide and water.

47. A process of treatment of greasetrap waste including the steps of:
    (a) passing waste material comprising an insoluble component through an anaerobic bioreactor system and maintaining said insoluble component as a suspension of the waste material, whereby the pH of the waste material is maintained below 4.9 for a period of at least 24 hours;
    (b) adding a source of lipases such as faeces to the waste material in the bioreactor system;
    (c) raising the pH of the waste material in the bioreactor system to a value of 6.0–8.0;
    (d) aerating the waste material after step (c); and
    (e) removing the insoluble component from the waste material before or after step (d).

48. A process as claimed in claim 47, wherein the anaerobic bioreactor system includes a plurality of bioreactors in series.

* * * * *